(12) United States Patent
Isaacs

(10) Patent No.: US 7,512,569 B2
(45) Date of Patent: Mar. 31, 2009

(54) USER DEFINED COMPONENTS FOR CONTENT SYNDICATION

(75) Inventor: Scott M. Isaacs, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 309 days.

(21) Appl. No.: 11/237,330

(22) Filed: Sep. 28, 2005

(65) Prior Publication Data

US 2007/0094156 A1    Apr. 26, 2007

(51) Int. Cl.
*G06N 5/00* (2006.01)
(52) U.S. Cl. ............................................. 706/2; 706/45
(58) Field of Classification Search ...................... 706/2; 725/23
See application file for complete search history.

(56) References Cited

U.S. PATENT DOCUMENTS 7,269,835 B2 *   9/2007   Swix et al. ..................... 725/23

* cited by examiner

*Primary Examiner*—Wilbert L Starks, Jr.
(74) *Attorney, Agent, or Firm*—Vierra Magen Marcus & DeNiro LLP

(57) ABSTRACT

A behavior is associated with a syndicated feed. The syndicated feed is associated with a content page, and provided from a server over a network. The syndicated feed may be an RSS feed or some other type of syndicated feed associated with a content page. The feed is accessed by an application and then associated with the behavior. The feed with the associated behavior is then provided to a user through an interface. A binding can be used to associate a behavior with a feed. The binding may include resources, scripts and other bindings, all of which may be distributed over a system or network.

18 Claims, 6 Drawing Sheets

USER DEFINED COMPONENTS FOR CONTENT SYNDICATION

CROSS REFERENCE TO RELATED INVENTION

The instant non-provisional application is related to the following patent application, which is hereby incorporated by reference in their entirety:

U.S. patent application Ser. No. 11/218,112 filed on Sep. 1, 2005, entitled "Object Oriented Web Application Framework", having inventors Scott M. Isaacs and Greg A. Marks.

BACKGROUND

Websites on the Internet provide information regarding news, religion, blogs, community information, product information and other information. As information is updated on these different websites, users having access to the Internet can keep track of the updated information using really simple syndication (RSS). RSS is a method for providing information regarding content changes for one or more web sites. Websites can provide an RSS feed for information regarding website updates. An RSS feed may include a list of headlines, update notices, and a link to the website. RSS readers, or aggregators, access RSS feed content over the Internet. RSS aggregators then provide the content through a user interface, such as a browser application. In this manner, RSS allows people interested in multiple websites to keep track of content changes on those websites.

RSS feeds typically contain a list of items presented in order from newest to oldest. Each feed item may include a title describing the website item or heading along with a more detailed description. Additionally, a link to the webpage can also be provided. RSS aggregators typically provide the list of website headings from the RSS feed through a user interface. When a heading is selected by a user, the aggregator can provide a summary of the content and/or retrieve the webpage associated with the title.

An RSS feed describes content that is rendered as a relatively plain, predefined experience. RSS aggregators typically provide content from one or more RSS feeds in a uniform and straightforward manner. If RSS feeds are extended, the tool or host provider must also develop an experience that matches the particular extension.

SUMMARY

The technology herein, roughly described, associates a behavior with a syndicated feed. The syndicated feed is usually associated with a content page, wherein the content page and feed can be provided by a server over a network. The syndicated feed may be an RSS feed or some other type of feed. An application located may remotely access the feed and then associate the feed with a behavior. The feed and associated behavior can then provided to a user through an interface.

In one embodiment, a binding is used to associate a behavior with a feed. A binding may include resources, scripts and other bindings. Bindings may be distributed over a system of network. Thus, the feed, behavior (or binding), and host can be published from different domains. In addition, a repository of user-defined and other bindings (analogous to a web service registry) may also be provided.

The binding allows the feed to be provided as a custom experience. In one embodiment, a binding may provide its own style or inherit a look-and-feel from another binding or the environment it is provided in. User defined bindings may also have access to application level services. This may allow access to a user identifier, data stores, and other functionality.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

The technology herein, roughly described, associates a behavior with a syndicated feed. The syndicated feed is provided by a server over a network. In some cases, the feed is associated with a content page. The content page and associated feed are accessible from the server over a network. Once accessed, the feed is associated with a behavior by a feed reader or aggregator application. The feed and associated behavior can then provided through a user interface. A feed reader or aggregator application can provide the feed content in a custom manner according to the particular behavior.

In one embodiment, the syndicated feed may be implemented as a really simple syndication (RSS) feed. In this case, the aggregator or reader accessing the feed may be implemented as an RSS aggregator or reader. For purposes of discussion, an RSS feed, aggregator and/or reader are discussed below. This is not intended to limit the scope of the present technology to that associated with RSS.

In one embodiment, a binding is used to associate a behavior with an RSS feed. The binding allows the RSS feed to be provided as a custom experience. A binding may include resources, scripts, other bindings, and other elements. A binding may also have access to application level services. In this case, the binding may have access to a user identifier, data stores, and other functionality of an application.

Binding content may be located locally or distributed over a network. When located over a network, the binding resources can be located at a single location or several locations. Thus, the feed, elements of a behavior, and host providing the feed can be published from several different domains.

Figure 1:
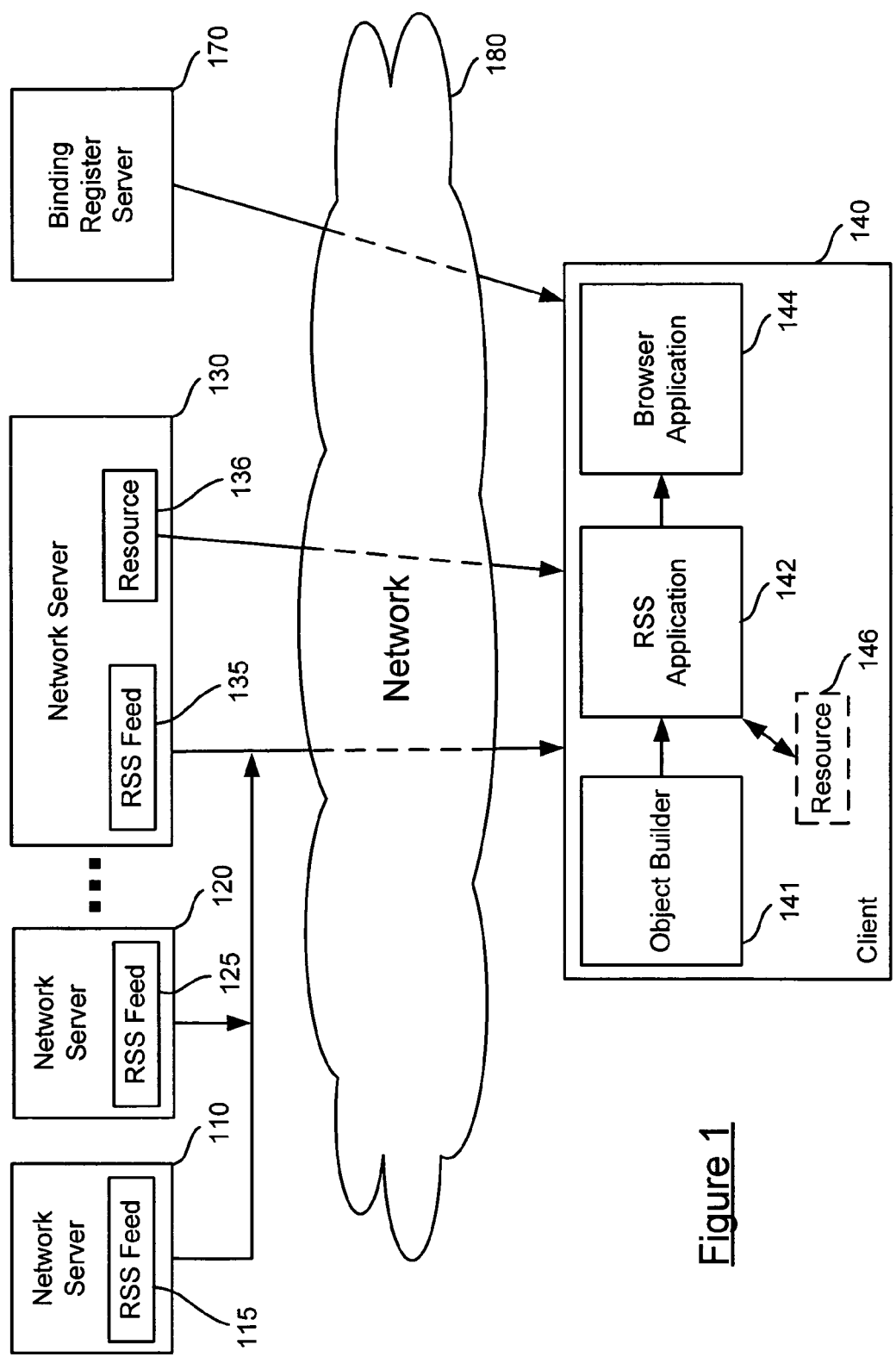
FIG. 1 illustrates an embodiment of a system for associating a behavior with an RSS feed.

FIG. 1 illustrates an embodiment of a system 100 for associating a behavior with an RSS feed. System 100 includes Network server 110, Network server 120, Network server 130, Client 140, and Binding Register Server 170. Client 140 may communicate with Network servers 110-130 and Binding Register Server 170 through Network 180. In one embodiment, Network 180 may be implemented as the Internet.

Network servers 110-130 may provide content to Network Browser Application 144 in response to a content request. In one embodiment, Network Servers 110-130 may be implemented as web servers. In this case, network servers 110-130 may provide web page content. A network server providing a content page may also include an RSS feed. In particular, Network server 110 may include RSS feed 115, Network Server 120 may include RSS feed 125, and Network Server 130 may include RSS feed 135. In one embodiment, an RSS feed is defined in extended mark-up language (XML). In other embodiments, the RSS feed may be defined in some other language or format. Network Server 130 also includes Resource 136. Resource 136 may be accessed as part of a binding for associating a behavior with an RSS feed. An RSS application located on a client device, such as RSS application 142, may access RSS feeds 115-135 and Resource 136. Network Servers 110-130 may send and receive information with Client 140 over Network 180. Though three Network Servers are illustrated in System 100, more or less may be implemented.

Resource 136 may be utilized to provide all or part of a behavior for an RSS feed. Resource 136 may include a script file, cascaded style sheet (CSS), a common language runtime (CLR) assembly, a dynamic link library (DLL), or some other element, such as a database. The resource may modify RSS feed content, an element within a webpage, or otherwise be utilized to provide a behavior for an RSS feed. Resource 136 may be accessed by RSS application 142 and browser application 144.

Binding Register Server 170 may include a binding registry having one or more bindings. The bindings can be accessed by RSS Application 142, browser application 144 and other applications. The bindings may be accessed and associated with an RSS feed by RSS Application 142. The RSS feed and binding can then be provided through a webpage by Browser Application 144 or some other user interface. Operation of Binding Register Server 170 is discussed in more detail below in method 400 of FIG. 4.

Client 140 may include RSS Application 142, Browser Application 144, Object builder 141, and optionally Resource 146. Browser Application 144 may be implemented as an Internet browser application. In one embodiment, RSS Application 142 may be implemented as a RSS Aggregator or RSS Reader application. RSS Application 142 may retrieve RSS feeds, such as those from Network servers 110-130. RSS Application may then process the RSS feeds and provide Browser Application 144 with content from the RSS feeds. RSS Application 142 may be supported using Framework 146.

In one embodiment, object builder 141 comprises a module for associating feeds and behaviors. Object builder 141 may be implemented as one or more JavaScript files interpretable by Browser Application 144. Alternatively, Object builder 141 may be incorporated as part of RSS application 142. Alternatively, Object builder 141 may be part of a web application management framework such as that discussed in patent application Ser. No. 11/218,112, titled "Object Oriented Web Application Framework," having inventors Scott M. Isaacs and Greg A. Marks, filed Sep. 1, 2005, hereby incorporated by reference in its entirety.

Resource 146 may optionally be implemented on client 140. Similar to Resource 136 on Network Server 130, Resource 146 may include a script file, cascaded style sheet (CSS), a common language runtime (CLR) assembly, a dynamic link library (DLL), or some other element that can be comprise part of a binding.

Figure 2:
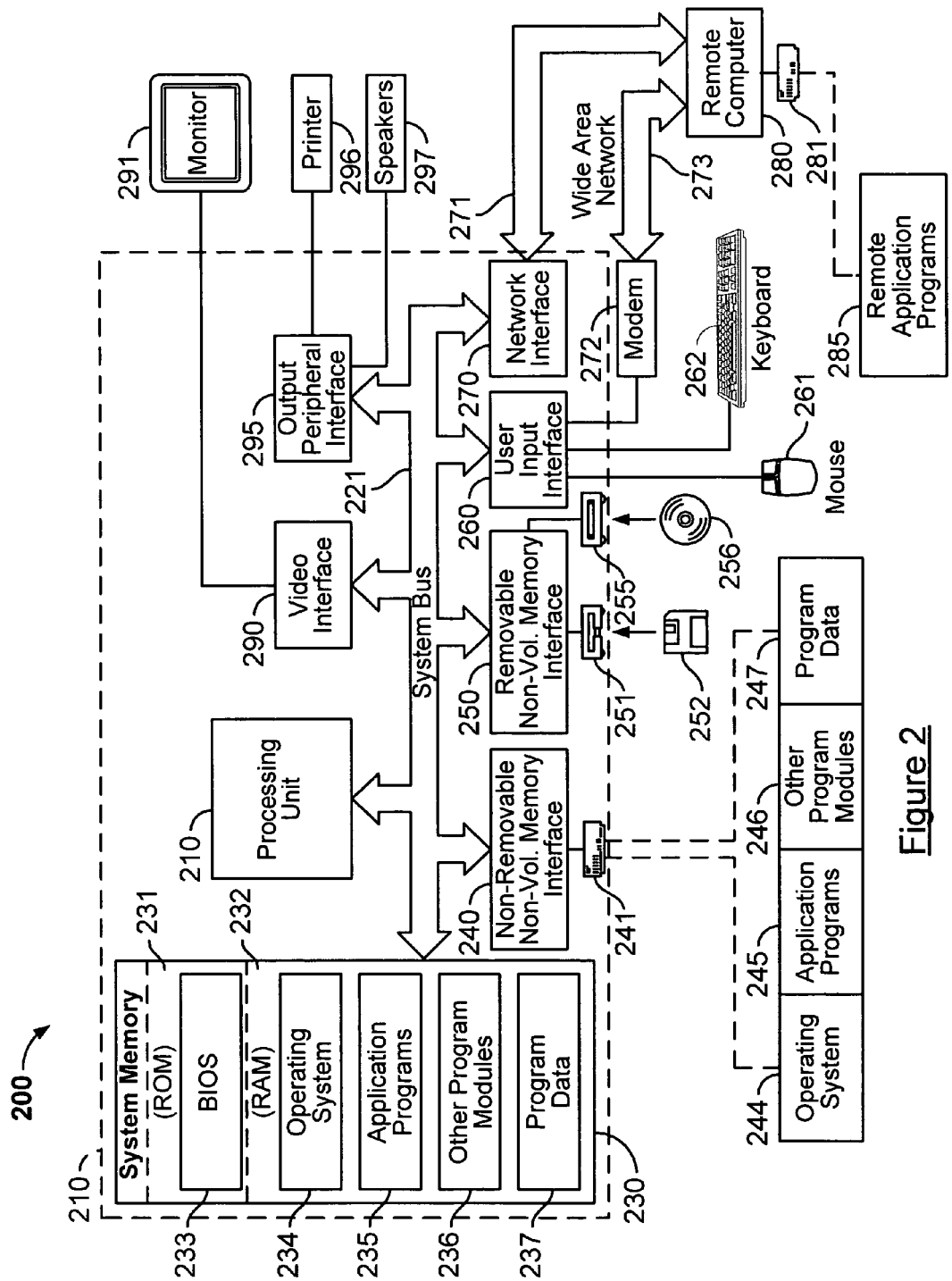
FIG. 2 illustrates an embodiment of a computing system for use with the present technology.

FIG. 2 illustrates an example of a suitable computing system environment 200 on which the present technology may be implemented. In particular, computing system 200 may be used to implement Network servers 110-130, Binding Register Server 170 and Client 140. The computing system environment 200 is only one example of a suitable computing environment and is not intended to suggest any limitation as to the scope of use or functionality of the present technology. Neither should the computing environment 200 be interpreted as having any dependency or requirement relating to any one or combination of components illustrated in the exemplary operating environment 200.

The present technology is operational with numerous other general purpose or special purpose computing system environments or configurations. Examples of well known computing systems, environments, and/or configurations that may be suitable for use with the present technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc. that perform particular tasks or implement particular abstract data types. The present technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the present technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
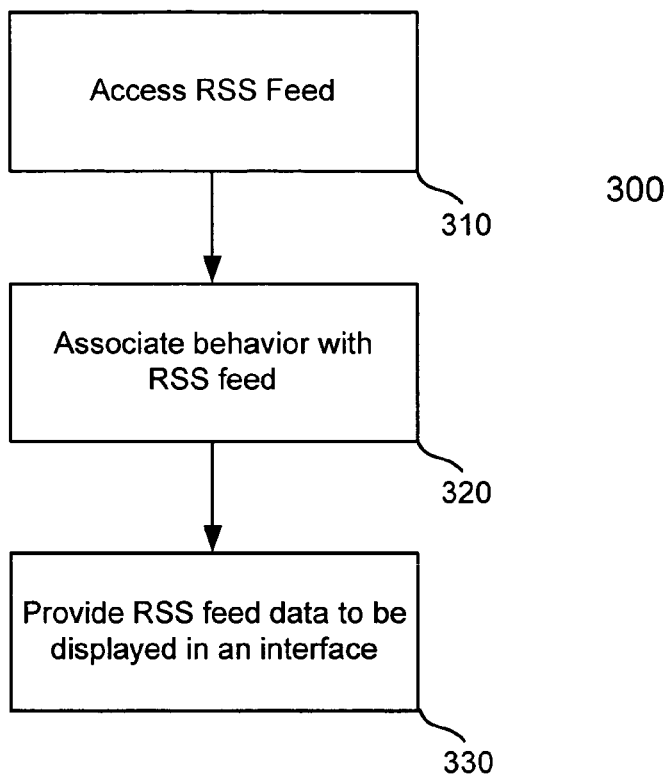
FIG. 3 illustrates an embodiment of a method for providing an RSS feed with a behavior.

As discussed above, RSS application 142 may associate an RSS feed with a behavior and provide the resulting RSS feed. FIG. 3 illustrates an embodiment of a method 300 for associating an RSS feed with a behavior. First, an RSS feed is accessed at step 310. In one embodiment, accessing an RSS feed includes retrieving a feed stored locally or remotely. For example, any of RSS feeds 115, 125 and 135 can be retrieved by RSS Application 142 located on Client 140. The RSS feed may be retrieved programmatically or in response to user input.

A behavior is associated with the retrieved RSS feed at step 320. In one embodiment, associating a behavior with an RSS feed includes identifying the behavior embedded in the RSS feed. Once the embedded behavior is identified, resources and other content associated with the behavior are retrieved. The feed can then be processed to incorporate the behavior. In one embodiment, this includes placing the feed into a particular format associated with the behavior (such as a table format). Step 320 of method 300 is discussed in more detail below with respect to method 500 of FIG. 5.

After a behavior is associated with an RSS feed, the RSS feed data is provided to be displayed in an interface at step 530. In one embodiment, the feed data incorporating the behavior is provided by RSS Application 142 to Browser Application 144. Browser Application 144 can then provide the feed data in an interface. An example of an interface 700 for providing feed data is discussed in more detail below with respect to FIG. 7.

Figure 4:
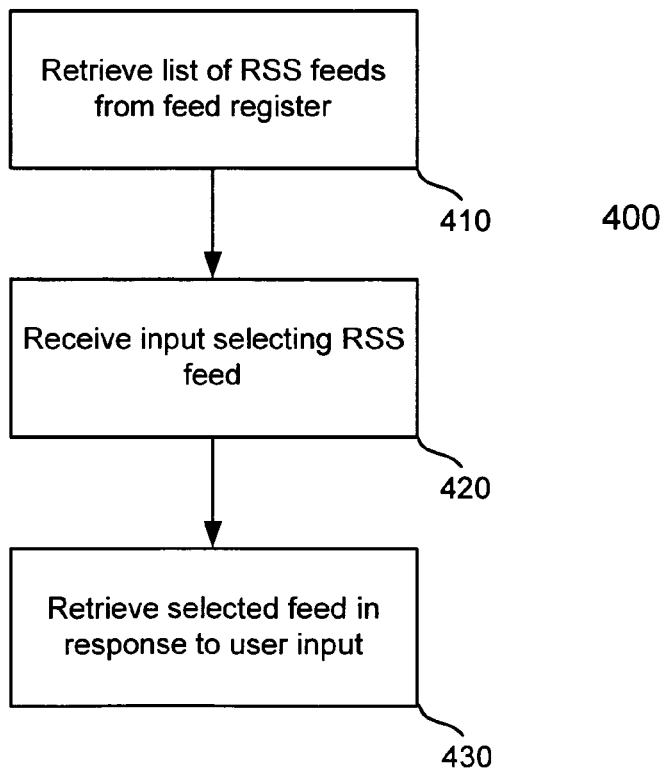
FIG. 4 illustrates an embodiment of a method for retrieving an RSS feed.

Before a behavior is associated with the feed, the RSS feed is defined. When defined, the RSS feed may have binding elements embedded within the feed. The binding can be generated by a user or retrieved from a binding registry. In one embodiment, RSS Application 142 may access a list of behavior or bindings from Binding Register Server 170 of system 100. Method 400 of FIG. 4 illustrates a method for retrieving a binding from Binding Register Server 170. RSS Application 142 retrieves a list of bindings from Binding Register Server 170 at step 410. In one embodiment, a requesting entity (such as RSS Application 142) sends a Binding List Request to Binding Register Server 170. In response to receiving the request, Binding Register Server 170 prepares a Binding List Response. A Binding List Response includes a list of the bindings available. In one embodiment, the Binding Request may include identifiers or other parameters for which to search the bindings maintained by Binding Register Server 170. In this case, Binding Register Server 170 will search a bindings list using the parameters from the Binding Request. The resulting bindings will then be packaged into the Binding Response. Once the Binding Response is determined, Binding Register Server 170 sends the Binding Response to the entity that sent the Binding Request.

Input is received selecting one of the bindings at step 420. In one embodiment, the requesting entity (such as RSS Application 142) retrieves the listed bindings from the Binding Response and provides the binding list data to Browser Application 144. Browser Application 144 then presents the list of bindings in a user interface. The user may then provide input selecting one of the bindings. The input may be received through the interface provided by Browser Application 144. Once a binding is selected, Browser Application 144 communicates the selection to RSS Application 142.

The selected binding is retrieved at step 430. RSS Application 142 may send a Binding Request to Binding Register Server 170. Binding Register Server 170 receives the Binding Request, retrieves the requested binding, and provides the binding to RSS Application 142.

Figure 5:
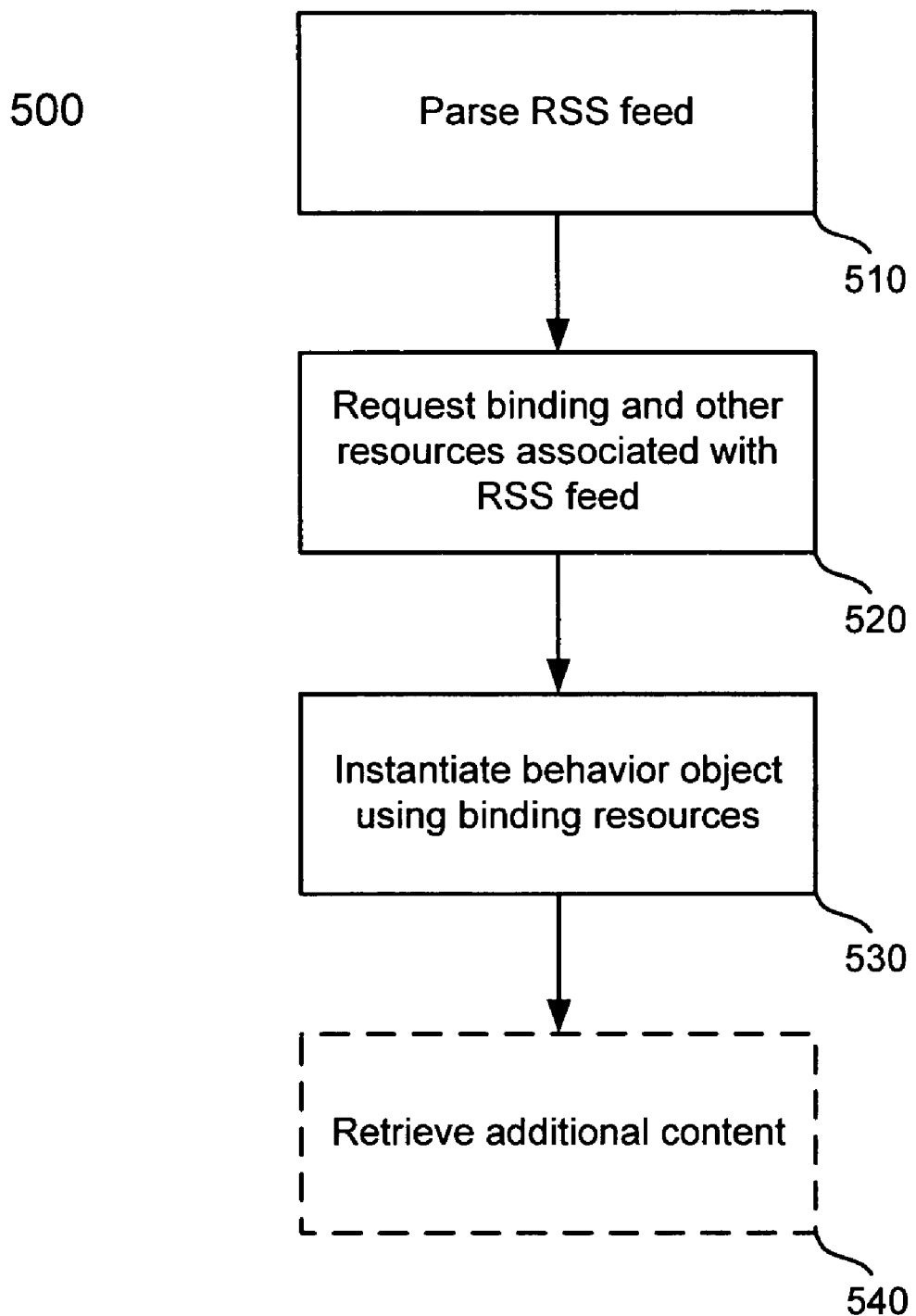
FIG. 5 illustrates an embodiment of a method for associating a behavior with an RSS feed.

Once an RSS feed is defined and retrieved, the feed is associated with a behavior. FIG. 5 illustrates an embodiment of a method 500 for associating a behavior with an RSS feed. In one embodiment, method 500 of FIG. 5 provides more detail for step 320 of method 300 discussed above.

First, an RSS feed is parsed at step 510. In one embodiment, the RSS feed is parsed to identify a binding and other resources within the feed. Binding and other resources identified in the RSS feed are then requested at step 520. These requested resources may provide a custom user experience to the RSS feed through Browser Application 144. Parsing of an RSS feed is discussed in more detail below with respect to method 600 of FIG. 6.

Once the binding resources are received, behavior objects are instantiated at step 530. In one embodiment, binding resources requested at step 520 are used to instantiate the behavior objects. After the behavior objects are instantiated, additional content may optionally be retrieved at step 540. In some cases, additional content may include the content associated with the RSS feed retrieved at step 310 of method 300. Additionally, other feeds contained within the retrieved feed may be retrieved. Step 540 is optional in method 500.

Figure 6:
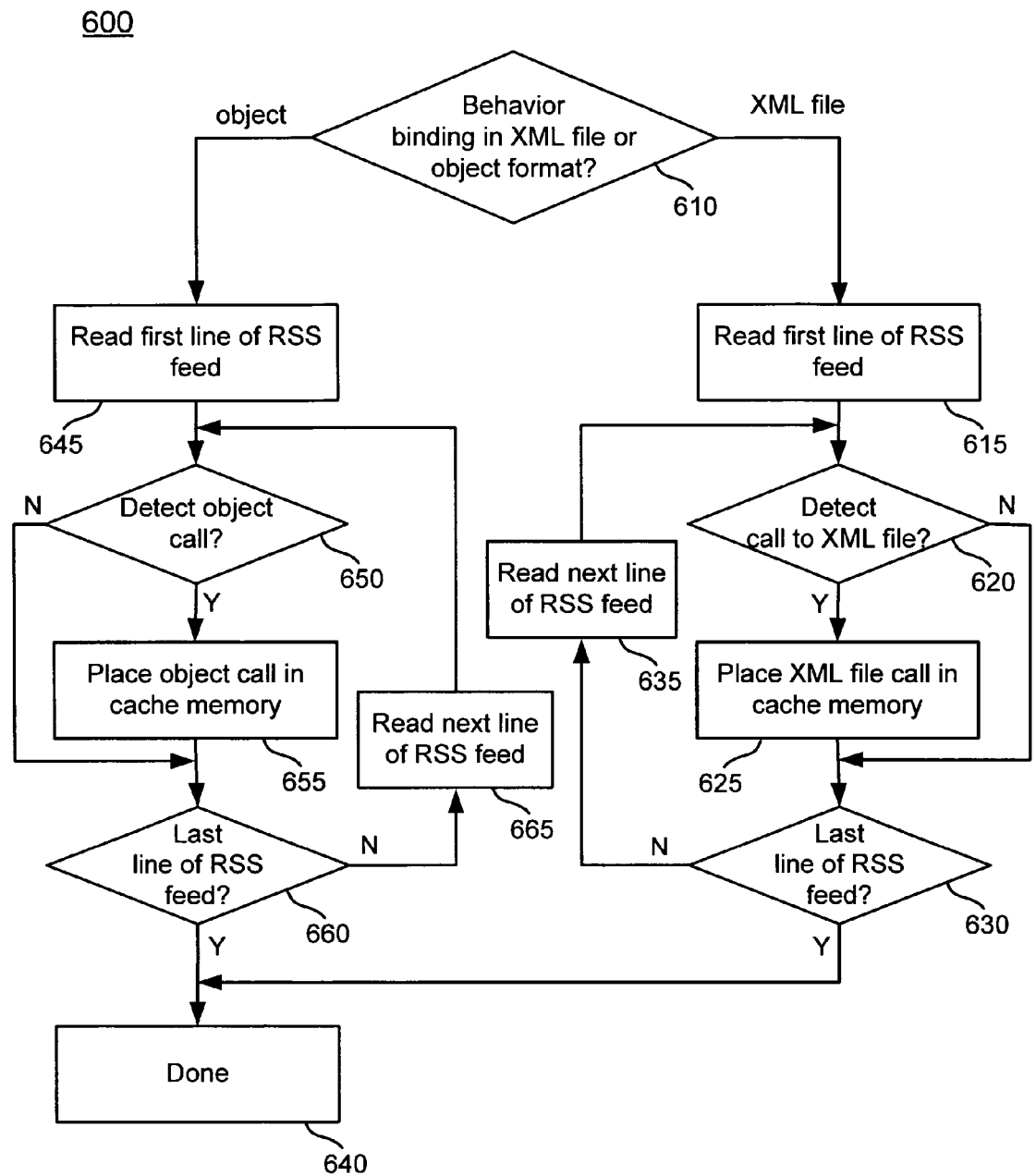
FIG. 6 illustrates an embodiment of a method for parsing an RSS feed.

FIG. 6 illustrates an embodiment of a method 600 for parsing an RSS feed. In one embodiment, method 600 provides more detail for step 510 of method 500 discussed above.

In one embodiment, the RSS feed will contain bindings in a particular format. Though any of a number of binding formats is possible, bindings in the form of an XML file and callable objects will be considered with respect to FIG. 6. A determination is made at step 610 as to whether the binding within the RSS feed is retrieved as an XML file or called as an object. If the RSS feed binding is called as an object, operation continues as in step 615. An example of an RSS feed with a binding in the form of a callable object is discussed in more detail below. If the RSS feed binding is retrieved as an xml file, operation continues to step 645. An example of an RSS feed with a binding in the form of a referenced XML file is discussed in more detail below as well. In one embodiment, the RSS feed may include a parameter indicating the binding type. In this case, the determination made at step 610 will be made in response to detecting the parameter. In some embodiments, the entire RSS feed may be searched for some other indication of what type of binding format is used.

A first line is read from the RSS feed at step 615. Next, a determination is made as to whether a call to an XML file is detected in the first read line at step 620. If a call to an XML file is detected, operation continues to step 625. If a call to an XML file is not detected in the read line, operation continues to step 630.

The identified XML file call is placed in cache memory at step 625. Operation then continues to step 630. A determination is made as to whether the previously read line is the last line within the RSS feed at step 630. If additional lines exist, operation continues to step 635. The next line within the RSS feed is accessed and read at step 635 and operation continues to step 620. If the previously read line is the last line read at step 630, operation ends at step 640.

If the behavior is determined to be in the format of a callable object at step 610, the first line of the RSS feed is read at step 645. Next, a determination is made as to whether an object call is detected within the read line at step 650. If no object call is detected, operation continues to step 660. If an object call is detected at step 650, operation continues to step 655. The object call is placed in cache memory at step 655. In one embodiment, the object call is placed within a list of resources to request at step 620 of method 600. Operation then continues to step 660.

A determination is made at step 660 as to whether the last line read is the last line of the RSS feed at step 660. If the last line read is the last line of the RSS feed, operation continues to step 640. If there are additional lines to read within the current RSS feed, the next line is read at step 665 and the operation continues to step 650.

As discussed above with reference to method 600 of FIG. 6, a binding may be implemented within an RSS feed in several ways. In one embodiment, a binding's resources may be defined within a feed. In this case, the binding may be marked with tags within the feed. One type of tag may specify a class type of the object comprising the binding. Another type of tag, such as an attribute tag, may specify a resource type. An example of an RSS feed having a binding implemented as a callable object is shown below.

---

```
(<?xml version="1.0"?>
<rss version="2.0" ObjectBuilder="http://www.website.com">
    <channel>
        <title>RSSfeedsite</title>
        <link>http://www.RSSfeedsite.com</link>
        <description>Description of the feed</description>
        <language>en-us</language>
```

-continued

```
    <pubDate>Wed, 27 Apr 2005 04:00:00 GMT</pubDate>
    <binding:class environment="Msn" version="1.0">Demo.RSSfeedsite</binding:type>
    <image>
        <url>http://www.RSSfeedsite.com/images/RumorRSS3.gif</url>
        <title>RSS feed site</title>
        <link>http://www.RSSfeedsite.com/</link>
        <width>102</width>
        <height>80</height>
        <image>
    <lastBuildDate>Wed, 27 Apr 2005 04:00:00 GMT</lastBuildDate>
    <docs>http://yourHomePage.com/docs.htm</docs>
    <webMaster>about@yourhomepage.com</webMaster>
    <item>
        <link binding:type="script">custom/RSSfeedsite.js</link>
    </item>
    <item>
        <link binding:type="css">custom/RSSfeedsite.css</link>
    </item>
  <channel>
</rss>
```

The RSS feed above is for a binding defined at www.RSSfeedsite.com. The format of the feed is considered the manifest defining the resources necessary for the behavior. The website provides information regarding miscellaneous content. The RSS feed instantiates an object having a class type "Demo.RSSfeedsite." This is specified at line ten of the RSS feed, which reads, "<binding:class environment="Msn" version="1.0">Demo.RSSfeedsite</binding:class>." The environment specifies the type of system that can interpret and instantiate the specified binding. The resource type may be scripts, style sheets, or any other resource file such as an assembly or DLL depending upon the defined environment. Line twenty five defines a cascaded style sheet resource, or css, which reads, "<link binding:type="css">custom/RSSfeedsite.css</link>." Thus, in one embodiment, the behavior can be associated with an environment. This allows different manifests to be specified for different environments (e.g., a DHTML based behavior for the web browser, a DLL/ActiveX behavior for a windows32 application, and so on.

In another embodiment, a binding may be defined within an RSS feed as a reference to an XML file. The referenced XML file may be a manifest as defined above and include the style sheets, jpeg files, and other resources associated with a behavior. An example of an RSS feed associated with a binding manifest is illustrated below.

```
<?xml version="1.0" encoding="utf-8"?>
<rss version="2.0" ObjectBuilder="http://www.website.com">
<channel>
<title>RSS feed site</title>
<description>Anonymous miscellaneous content cleverly crafted by you and others to amuse,
baffle and waste time.</description>
    <link>http://www.RSSfeedsite.com/private/</link>
    <language>en-US</language>
    <pubDate>Fri, 6 May 2005 20:50:51 GMT</pubDate>
    <lastBuildDate>Fri, 6 May 2005 20:50:51 GMT</lastBuildDate>
    <ttl>15</ttl>
    <binding:manifest environment="Msn"
version="1.0">custom/RSSfeedsite.xml</binding:manifest>
    <image>
    <url>http://www.RSSfeedsite.com/private/images/RumorRSS3.gif</url>
    <title>RSS feed site</title>
    <link>http://www.RSSfeedsite.com/private/</link>
    <width>102</width>
    <height>80</height>
    </image>
    <item>
    <title>Be a RSS feed sitecontributor</title>
    <link>http://www.RSSfeedsite.com/private/dlgossip.aspx</link>
    <description><img border="0" align="left"
src="http://www.RSSfeedsite.com/private/images/logo-t2.gif" width="157" height="123"
/><h3>Contribute your own content</h3><p>What's on your mind? Heard any good jokes
lately? Have a clever insight you'd like to share?<br><a
href="http://www.RSSfeedsite.com/private/dlgossip.aspx">Submit your <em>own</em>
content at <b>RSS feed site</b></a>.</p></description>
    <category>Subtle encouragement</category>
    <guid isPermaLink="false">dd694cdc-7b33-49cf-8cff-0d07d499a4dc</guid>
    <pubDate>Fri, 6 May 2005 20:50:51 GMT</pubDate>
    </item>
    <item>
    <title>asdfasdfasdf</title>
```

```
        <link>http://www.RSSfeedsite.com/private/dlgossip.aspx</link>
        <description>asdfasdfasdf</description>
        <category>Content</category>
        <guid isPermaLink="false">03e28465-68f7-4e70-9ae9-dfd01233fc86<guid>
        <pubDate>Fri, 6 May 2005 20:50:51 GMT</pubDate>
      </item>
      <item>
        <title>New Content!<title>
        <link>http://www.RSSfeedsite.com/private/dlgossip.aspx</link>
        <description>New content!</description>
        <category>Content</category>
        <guid isPermaLink="false">9b59dd28-bbcb-451e-aad5-e9d25eb4eb36</guid>
        <pubDate>Tue, 3 May 2005 22:13:47 GMT</pubDate>
      </item>
      <item>
        <title>Start.com/3 is going to be amazing!</title>
        <link>http://www.RSSfeedsite.com/private/dlgossip.aspx</link>
        <description>website/3 is going to be amazing!</description>
        <category>Content</category>
        <guid isPermaLink="false">02e48022-dee5-4833-937c-6b67a0990573</guid>
        <pubDate>Tue, 3 May 2005 05:40:29 GMT</pubDate>
      </item>
      <item>
        <title>This content is only available to people w...</title>
        <link>http://www.RSSfeedsite.com/private/dlgossip.aspx</link>
        <description>This content is only available to people who know the secret URL</description>
        <category>Content</category>
        <guid isPermaLink="false">939c7c3e-01ba-45da-85f5-6a92982839fa</guid>
        <pubDate>Tue, 3 May 2005 05:16:50 GMT</pubDate>
      </item>
      <item>
        <title>The first content</title>
        <link>http://www.RSSfeedsite.com/private/dlgossip.aspx</link>
        <description>This is the first content.</description>
        <category>Content</category>
        <guid isPermaLink="false">3c4f8380-c9c0-459f-9790-619db85887c2</guid>
        <pubDate>Tue, 3 May 2005 01:46:03 GMT</pubDate>
      </item>
    <channel>
<rss>
```

The RSS feed above is for the syndicated content from the web site "RSS feed site" at www.RSSfeedsite.com. The RSS feed references a manifest file called "RSSfeedsite.xml." The XML file is referenced at line twelve of the RSS feed, which reads, "<binding:manifest environment="Msn" version="1.0">custom/RSSfeedsite.xml</binding:manifest>." Additional manifests can be defined to support multiple environments within a single RSS feed.

Figure 7:
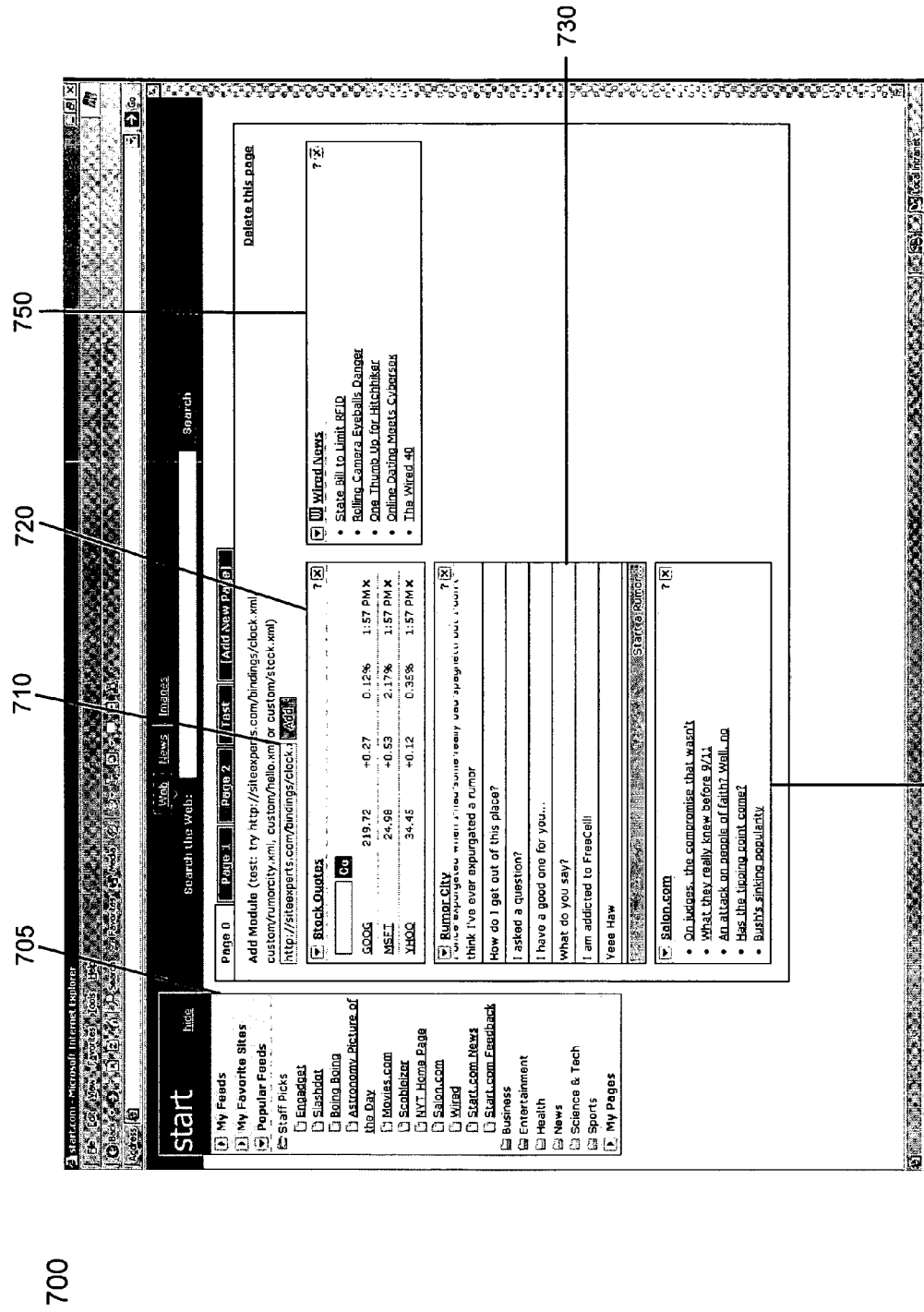
FIG. 7 illustrates an embodiment of a user interface associating a behavior with an RSS feed.

FIG. 7 illustrates an example of a user interface 700 for use with the present technology. In one embodiment, interface 700 may be provided by a browser application, such as browser application 144 on client 140 of FIG. 1. Interface 700 includes a Feeds Module 705, Bindings Module 710 and RSS Feed Windows 720, 730, 740 and 750.

In operation, a user may select a feed through Feeds Module 705. A feed module may include a list of user selected feeds as well as other feeds, such as "Popular Feeds." Once the feed is selected, the user may select a binding within Bindings Module 710. Bindings Module 710 may provide binding information retrieved locally (such as from Client 140) or remotely (for example, from Binding Register Server 170). Once a binding is selected, the binding is retrieved and applied to the selected particular RSS Feed. The resulting RSS feed is then provided as an RSS feed window. This general process is discussed above with respect to method 300 of FIG. 3.

Interface 700 includes four RSS feed windows. RSS feed Window 720 is includes stock information and stock quotes information, customized in the form of a table. Thus, the feed of stock information and stock quotes is combined with a behavior that places the information and quotes in table format. RSS feed Window 730 includes a list of rumors provided by the source of the RSS feed for "rumor city". Rather than listing each rumor as a link, the feed information is listed as a scrolling list of information. The RSS feeds associated with RSS feed windows 740 and 750 are provided without any behaviors. In particular, the information in windows 740 and 750 are provided as a list of links.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A method for providing a feed, comprising:

accessing syndicated feed data;

parsing the syndicated feed data;

associating the syndicated feed data with behavior data;

retrieving behavior data referenced by the syndicated feed data; and providing the syndicated feed data and associated behavior data to be displayed in an interface.

2. The method of claim 1, further comprising:
identifying behavior data associated with the syndicated feed data.

3. The method of claim 2, wherein said step of identifying behavior data includes:
calling a behavior object identified in the syndicated feed data; and
instantiating the behavior object.

4. The method of claim 2, wherein said step of identifying behavior data includes:
detecting an XML file in the syndicated feed data, the XML file including one or more resources; and
retrieving the one or more resources.

5. The method of claim 1, wherein the syndicated feed data is an RSS feed.

6. The method of claim 1, wherein said step of associating the syndicated feed data includes:
retrieving a list of behavior data sets;
selecting one of the behavior data sets in response to user input; and
formatting the syndicated feed data using the selected behavior data sets.

7. A system for providing a notification over a network, comprising:
a server able to send and receive information over a network, the server including:
a processor; and
a storage device, the storage device able to store syndicated content data, the syndicated content data including behavior data, the behavior data able to be processed to provide a format for providing the syndicated content data,
the processor able to identifying behavior code within the syndicated content data, the behavior code referencing one or more resources associated with a behavior,
the processor able to retrieve the resources referenced in the behavior code, the server able to transmit the syndicated content data over the network.

8. The system of claim 7, wherein the behavior data includes a call to a behavior object.

9. The system of claim 7, wherein the behavior data includes an XML file.

10. The system of claim 7, wherein the syndicated content data is an RSS feed.

11. The system of claim 7, further comprising:
a second server, the behavior data including a call to a resource, the second server including the resource.

12. One or more processor readable storage devices having processor readable code embodied on said processor readable storage devices, said processor readable code for programming one or more processors to perform a method comprising:
receiving a syndicated feed;
retrieving resources associated with the syndicated feed; and
processing the syndicated feed to be displayed in a format derived from the resources;
identifying behavior code within the syndicated feed, the behavior code referencing one or more resources associated with a behavior; and
retrieving the resources referenced in the behavior code.

13. The one or more processor readable storage devices according to claim 11, wherein said step of retrieving resources includes:
identifying a behavior object in response to processing the syndicated feed; and
retrieving resources associated with the behavior object.

14. The one or more processor readable storage devices according to claim 13, wherein processing the syndicated feed includes parsing the syndicated feed.

15. The one or more processor readable storage devices according to claim 13, wherein said step of processing the syndicated feed includes instantiating the behavior object.

16. The one or more processor readable storage devices according to claim 12, wherein the behavior code includes XML.

17. The one or more processor readable storage devices according to claim 12, wherein retrieving resources includes:
accessing a behavior in response to user input.

18. The one or more processor readable storage devices according to claim 17, wherein the behavior is accessed remotely.

* * * * *